United States Patent Office.

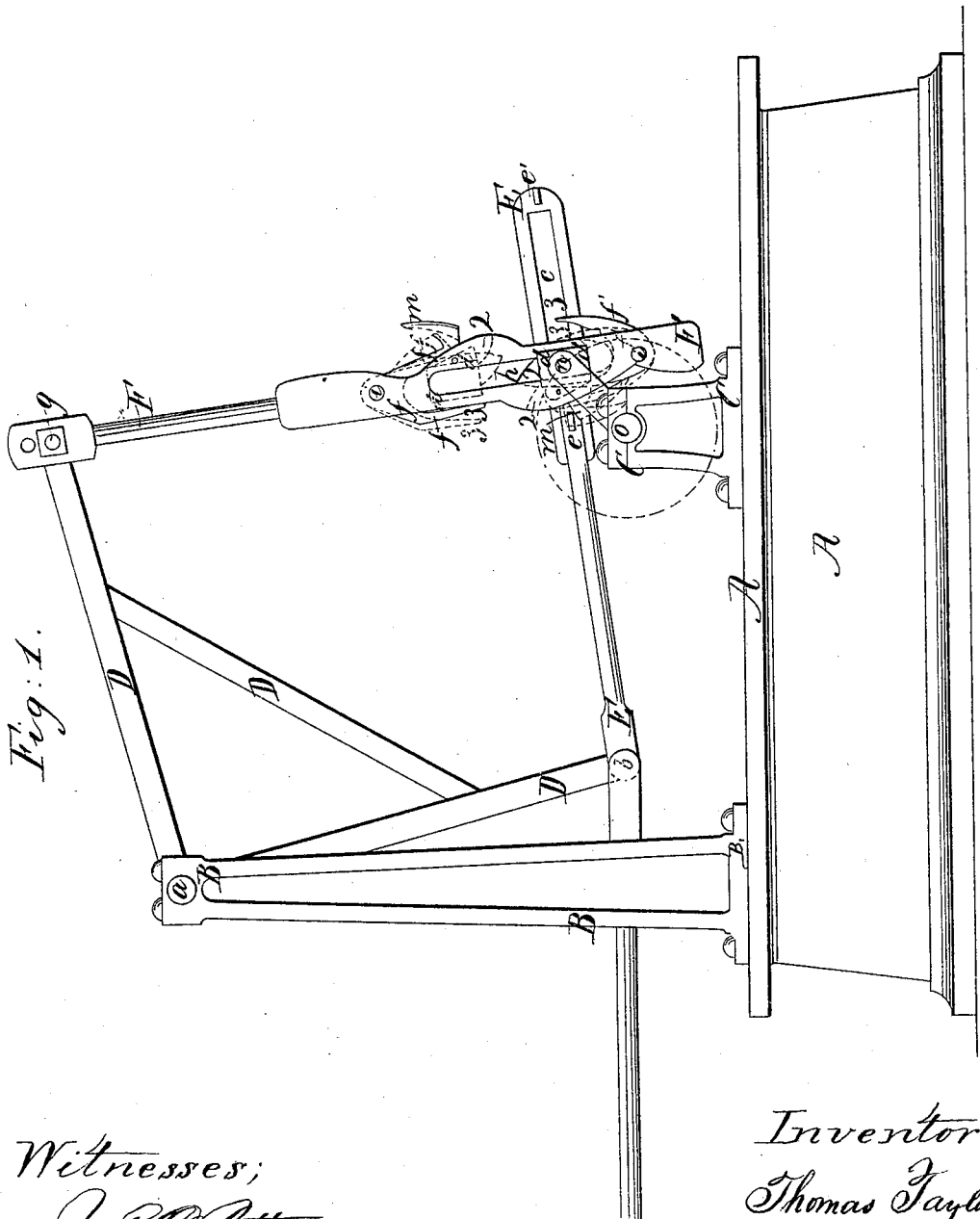

THOMAS TAYLOR, OF NEW ORLEANS, LOUISIANA.

Letters Patent No. 67,001, dated July 23, 1867.

---

IMPROVEMENT IN CRANK-MOTIONS.

---

The Schedule referred to in these Letters Patent and making part of the same.

---

TO ALL WHOM IT MAY CONCERN:

Be it known that I, THOMAS TAYLOR, of New Orleans, in the parish of Orleans, and State of Louisiana, have invented certain new and useful improvements in Crank-Motions; and I do hereby declare the following to be a full, clear, and exact description of the same, reference being had to the accompanying drawings, making a part of this specification, in which- Figure 1 represents a side elevation of the crank and its several appliances, shown in different working positions by black and red lines.

The object of my invention is to avoid the "dead-points" of the ordinary crank; and the nature of my invention consists in combining with a crank two slotted arms or connecting-rods and a crank-slide, which so trip and change positions, as that one or the other of said rods will always work at an advantageous angle with regard to the crank, and thus readily pass it over its otherwise "dead-points or centres."

To enable others skilled in the art to make and use my invention, I will proceed to describe the same with reference to the drawing.

A represents a bed-plate, base, or frame on which are placed the pillar-blocks B C, that afford the proper supports or boxes for the parts to move in. Upon a rock-shaft, $a$, that oscillates on the pillar-blocks B is a right-angled frame, D, to the lower end $b$ of which is pivoted a connecting-rod, E, that has a long slot $c$ in its farther or crank end, in which slot a crank-slide or box $d$ works, as will be hereafter explained, and upon the side of said connecting-rod, at or near each end of the slot $c$, there are dogs or seres $e\ e'$ which project far enough to strike upon trigger-catches $f\ f'$ upon the second or other connecting-rod F, to throw said trigger-catches into and out of action. To the extreme forward end of the horizontal part of the frame D, as at $g$, is pivoted the other or second connecting-rod F, its lower end being also slotted as at $h$, so that a crank-slide or box, like that, $d$, above mentioned, may move therein. Upon this connecting-rod F, and at points $i\ i$ thereon, are pivoted the two trigger-catches $f\ f'$. The form of the trigger-catches $f\ f'$ is shown in the drawings; they each have a hook, 2, for catching and holding the crank-slide $d$ when it is to be held at either end of the slot, and a trigger or tail-piece 3, which, when struck by the sere or dog $e$, will throw out the hook portion and allow the slide or the connecting-rod to move one upon the other. In connection with each of the hooked arms 2 of the trigger-catches, there is a pivoted piece, $m$, which moves the trigger-catch into action with the crank-slide, when said piece is struck by the dog or sere $e\ e'$, as the case may be, whilst the trigger or tail-piece 3, when it is struck, moves the hook out of action or connection. $n$ is the crank-pin or wrist, and $o$ the crank-journals or shaft, which rest and turn in or on the pillar-blocks C. The crank-slides $d$ are flanged, so as to run freely in or on the rod with which they act in concert, and the crank or wrist-pin $n$ passes through these slides or boxes, so that the connecting-rods, though working upon and turning the crank, do not connect directly with the crank-wrist, but indirectly through the slides $d$, nor do the slides make the regular circular movement that the crank does, notwithstanding they go clear around with the crank, for during the rotation of the crank the slides maintain the positions or direction of the slots in the connecting-rods, and do so by turning upon the crank-wrist $n$. The slides may be radial to the centre of motion of the crank at two diametrical points in its entire circuit, but that is all. At other points or parts of its rotation it or they maintain the direction of the slots in the connecting-rods with which they work. If these two connecting-rods E F were attached to the crank in the ordinary way they would each have their "dead-points or centres" to pass, and no advantages would be gained, but by interposing a connecting and disconnecting mechanism between said connecting-rods and the crank, so that each rod of the pair, as it is about to pass the "dead-centre," should be disconnected from or slide inactively upon the crank, or the crank upon it, whilst the other rod is in its most active or advantageous position or working angle with regard to the crank, then the "dead-points or centres" are passed without jar or friction. The two rods E F are by no means independent of each other, for in the first place they are both connected to one and the same frame D, though to different arms thereof, but neither the rods or the frame could move independent of each other were it not for the slots in each through which the crank and its slides may pass, when the latter are disconnected, and leave the rod inactive or passive for the time. Again, both of the connecting-rods are connected actively or inactively with the same crank, and thus they may be said to be connected at each of their ends to one and the same piece or part, though performing different duties at different times. When the crank-slide is locked to its rod, the rod goes with the crank; when it is unlocked from its rod the latter moves inactively upon the slide. The rod E, at each end of its stroke, turns the crank over or beyond what would be the dead-centre for its mate or fellow F, and locks or unlocks (as the case may be) the crank-slide $d$, so that the rod F may turn the crank or move on the crank whilst it is turned by the other rod to get into its proper position for availing of the most advantageous angle upon the crank.

Having thus fully described the nature, object, and purpose of my invention, what I claim as new and desire to secure by Letters Patent, is, first—

In combination with a single crank, the two slotted connecting-rods and single frame, constructed and operating together substantially as and for the purpose described.

I also claim, in combination with the crank and two connecting-rods, the crank-slides and connecting and disconnecting mechanism, substantially such as described, for allowing said rods to pass their "dead-points or centres" as set forth.

THOMAS TAYLOR.

Witnesses:
 W. W. LAURASON,
 DAVID HENLY.